(12) United States Patent
Gao et al.

(10) Patent No.: US 11,477,842 B2
(45) Date of Patent: Oct. 18, 2022

(54) METHOD AND SYSTEMS FOR EXCHANGING MESSAGES IN A WIRELESS NETWORK

(71) Applicant: ZTE Corporation, Guangdong (CN)

(72) Inventors: Yin Gao, Shenzhen (CN); He Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 15 days.

(21) Appl. No.: 17/216,990

(22) Filed: Mar. 30, 2021

(65) Prior Publication Data

US 2021/0219376 A1    Jul. 15, 2021

Related U.S. Application Data

(63) Continuation of application No. 16/824,439, filed on Mar. 19, 2020, now Pat. No. 10,966,275, which is a continuation of application No. PCT/CN2017/104054, filed on Sep. 28, 2017.

(51) Int. Cl.

| | |
|---|---|
| *H04W 52/02* | (2009.01) |
| *H04W 76/27* | (2018.01) |
| *H04W 8/08* | (2009.01) |
| *H04W 64/00* | (2009.01) |
| *H04W 72/04* | (2009.01) |
| *H04W 74/08* | (2009.01) |
| *H04W 92/04* | (2009.01) |

(52) U.S. Cl.
CPC ............. *H04W 76/27* (2018.02); *H04W 8/08* (2013.01); *H04W 64/003* (2013.01); *H04W 72/04* (2013.01); *H04W 74/0833* (2013.01); *H04W 92/045* (2013.01)

(58) Field of Classification Search
None
See application file for complete search history.

(56) References Cited

U.S. PATENT DOCUMENTS

| 2013/0083714 A1 | 4/2013 | Joko et al. |
| 2019/0166559 A1 | 5/2019 | Chen et al. |

FOREIGN PATENT DOCUMENTS

| CN | 106658758 | 5/2017 |
| CN | 107027153 | 8/2017 |
| WO | WO-2017/111788 | 6/2017 |

OTHER PUBLICATIONS

Extended European Search Report for EP Appl. No. 17927228.1, dated Sep. 1, 2020. (16 pages).
First Office Action for CN Appl. No. CN 201780094762.4 dated Dec. 28, 2020 (with English translation, 19 pages).
(Continued)

*Primary Examiner* — Gary Lafontant
(74) *Attorney, Agent, or Firm* — Foley & Lardner LLP

(57) ABSTRACT

Methods and system for a centralized unit and a distributed unit of a base station to operatively cooperate with each other are disclosed. In one embodiment, a method performed by a first communication node includes: sending a first message to a second wireless communication node upon determining to switch a third wireless communication node to a radio resource control inactive mode. The first and second wireless communication nodes cooperate to serve as a first base station in a wireless network.

20 Claims, 10 Drawing Sheets

(56) References Cited

OTHER PUBLICATIONS

Huawei: "Stage 2 TP for support of RAN 10,13 notification area update", 3GPP Draft; R3-173084, 3GPP TSG RAN WG3, Meeting #97, Berlin, Germany; Aug. 21-25, 2017, 2 pages.
Huawei: "Support RRC inactive mode for CU-DU", 3GPP Draft; R3-173133, 3GPP TSG RAN WG3, Meeting #97, Berlin, Germany; Aug. 21-25, 2017, 2 pages.
Huawei:"TP on UE Context Management over F1 to 38.473", 3GPP Draft; R3-173109 3GPP TSG RAN WG3, Meeting #97, Berlin, Germany; Aug. 21-25, 2017, 7 pages.
International Search Report and Written Opinion of the International Searching Authority for PCT/CN2017/104054 dated Jul. 18, 2018 (6 pages).
NEC: "RAN Notification Area Configuration in NR", 3GPP Draft; R3-173030, 3GPP TSG RAN WG3, Meeting #97, Berlin, Germany; Aug. 21-25, 2017, 3 pages.
Non-Final Office Action on U.S. Appl. No. 16/824,439 dated Sep. 18, 2020.
Notice of Allowance on U.S. Appl. No. 16/824,439 dated Dec. 16, 2020.
Vivo: RAN oased notification area update, 3GPP Draft; R2-1704587 3GPP TSG RAN WG2, Meeting #98, Hangzhou, China; Apr. 15-19, 2017; 4 pages.
First Office Action for JP Appl. No. 2020-517539, dated Aug. 31, 2021 (with English translation, 10 pages).
Huawei: "Paging delivery over F1" 3GPP TSG RAN WG3 meeting #97; R3-173102; Aug. 25, 2017; Berlin, Germany (5 pages).
Huawei: "Support of PDCP duplication for EN-DC" 3GPP TSG-RAN WG3 #97; R3-173193; Aug. 25, 2017; Berlin, Germany (4 pages).
Huawei: "UE context management on F1" 3GPP TSG-RAN3 Meeting #97; R3-173106; Aug. 25, 2017; Berlin, Germany (6 pages).
Lenovo et al.: "23.501: Update to RRC inactive state" SA WG2 Meeting #122bis; S2-176044; Aug. 25, 2017; Sophia Antipolis, France (10 pages).

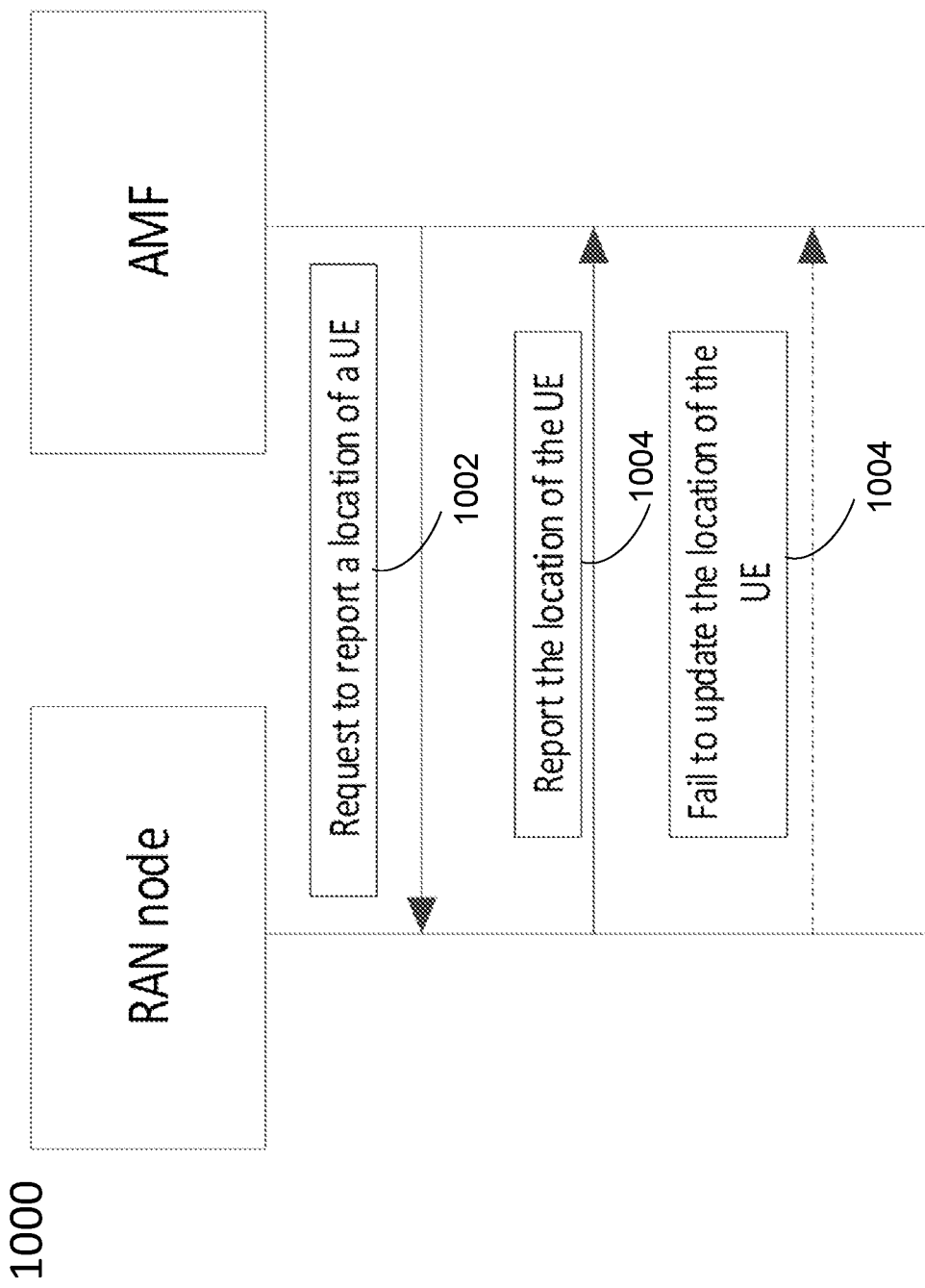

METHOD AND SYSTEMS FOR EXCHANGING MESSAGES IN A WIRELESS NETWORK

CROSS-REFERENCE TO RELATED APPLICATION

This application claims the benefit of priority under 35 U.S.C. § 120 as a continuation of U.S. Non-Provisional patent application Ser. No. 16/824,439, filed on Mar. 19, 2020, which is a continuation of PCT Patent Application No PCT/CN2017/104054, filed on Sep. 28, 2017, the disclosure of each of which is incorporated herein by reference in its entirety.

TECHNICAL FIELD

The disclosure relates generally to wireless communications and, more particularly, to exchanging messages between two wireless communication nodes in a wireless network.

BACKGROUND

Due to mass connection and higher rate requirements from users in the 5G New Radio (NR) communication network (5G network), there is a big challenge to the transmission capacity of the fronthaul interface CPRI (Common Public Radio Interface) between a BBU (Baseband Unit) and a RRU (Radio Remote Unit) in the LTE (Long-Term Evolution) communication network. Because the CPRI interface transmits an I/Q (real/imaginary) signal that has been processed by physical layer coding, the CPRI interface has a tighter requirement on the transmission delay and bandwidth. If the 5G F1 interface rate is increased to tens of giga-bits per second (Gbps), the traffic demand on the CPRI interface will rise to tera-bits per second (Tbps) levels, which will increase both the cost and difficulty of network deployment. Therefore, in the 5G network, there is a need to redefine divisions of the fronthaul interface, in consideration of transmission capacity, transmission delay, ease of deployment, and other aspects. For example, taking into account a non-ideal fronthaul transmission, when dividing a base station (BS), one can put delay-insensitive network functions in a first network element, such as a Centralized Unit (CU), and put delay-sensitive network functions in a second network element, such as a Distributed Unit (DU). There is an ideal and/or non-ideal fronthaul transmission between the first and second network element.

Moreover, since the 5G network can support a diverse range of applications such as, for example, Massive Machine-Type Communications (M-MTC), Ultra-Reliable and Low Latency Communications (URLLC), Enhanced Mobile Broadband (eMBB), etc., it is expected that an increasing number of user equipment devices (UE's) to be used in some of the above applications will be powered by batteries. Thus, power consumption of UE's in the 5G network has become one of the anticipated parameters to optimize or decrease. To this end, and additionally, to reduce signaling overheads between a random access network (RAN) and a core network (CN) in the 5G network, a new radio resource control (RRC) state, "RRC INACTIVE state," has been proposed. It is understood that a UE may be requested by a corresponding RAN (e.g., a BS) to switch to the RRC INACTIVE state after the UE has been inactive for a certain period of time. Different from the known RRC IDLE state, when the UE is in the RRC INACTIVE state, the UE can still move around and process paging messages.

To date, however, no research has been conducted regarding how the BS, when divided as CU and DU, switches the UE to the RRC INACTIVE state. In addition, when the UE, under the RRC INACTIVE state, moves into a new area (e.g., a random access network (RAN) notification area), no research has been conducted regarding how the CU and DU handle a process to update such a new RAN notification area. Thus, there is a need for a method and system for the CU and DU to cooperate with each other to handle such scenarios so as to meet the anticipated demands of the 5G network.

SUMMARY

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a first communication node includes: sending, by the first wireless communication node, a first message to a second wireless communication node upon determining to switch a third wireless communication node to a radio resource control inactive mode. The first and second wireless communication nodes cooperate to serve as a first base station in a wireless network.

In another embodiment, a method performed by a second communication node includes: receiving a first message sent by a first wireless communication node; and passing a first encoded container included in the first message to a third wireless communication node, wherein the first encoded container is configured to switch the third wireless communication node to a radio resource control inactive mode. The first and second wireless communication nodes cooperate to serve as a first base station in a wireless network.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

FIG. 10 illustrates a scenario in which a random access network node (RAN node) and an access and mobility management function (AMF) of a core network cooperatively perform an exemplary method to update a location of a user equipment device served by the RAN node, in accordance with some embodiments.

DETAILED DESCRIPTION OF EXEMPLARY EMBODIMENTS

Various exemplary embodiments of the disclosure are described below with reference to the accompanying figures to enable a person of ordinary skill in the art to make and use the disclosure. As would be apparent to those of ordinary skill in the art, after reading the present disclosure, various changes or modifications to the examples described herein can be made without departing from the scope of the disclosure. Thus, the present disclosure is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the disclosure is not limited to the specific order or hierarchy presented unless expressly stated otherwise.

Figure 1:
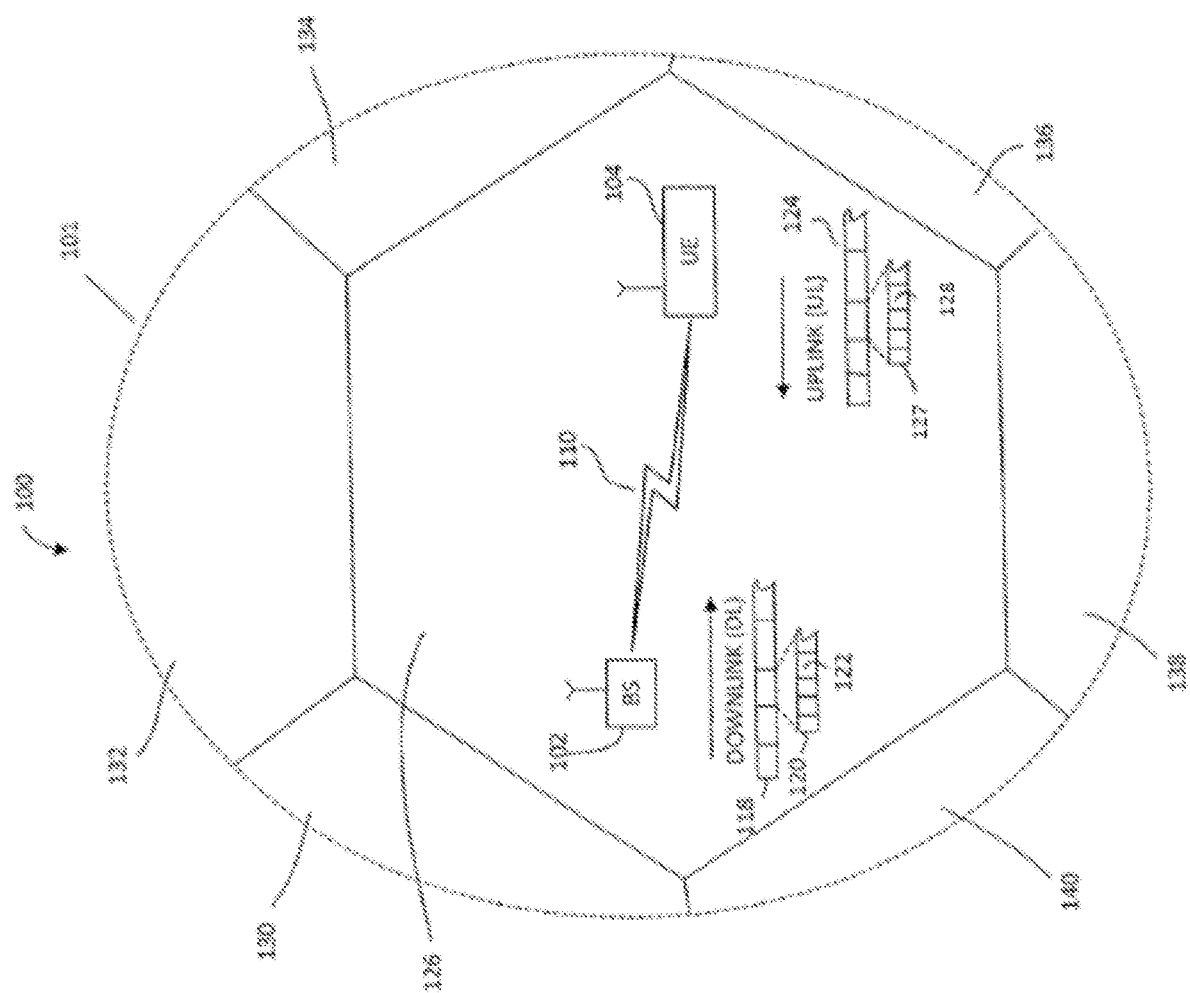
FIG. 1 illustrates an exemplary cellular communication network in which techniques disclosed herein may be implemented, in accordance with some embodiments of the invention.

FIG. 1 illustrates an exemplary wireless communication network 100 in which techniques disclosed herein may be implemented, in accordance with various embodiments of the present disclosure. The exemplary communication network 100 includes a base station (BS) 102 and a user equipment device (UE) 104 that can communicate with each other via a communication link 110 (e.g., a wireless communication channel), and a cluster of notional cells 126, 130, 132, 134, 136, 138 and 140 overlaying a geographical area 101. In FIG. 1, the BS 102 and UE 104 are contained within the geographic boundary of cell 126. Each of the other cells 130, 132, 134, 136, 138 and 140 may include at least one base station operating at its allocated bandwidth to provide adequate radio coverage to its intended users. For example, the base station 102 may operate at an allocated channel transmission bandwidth to provide adequate coverage to the UE 104. The base station 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the base station (BS) 102 and user equipment (UE) 104 are described herein as non-limiting examples of "communication devices," generally, which can practice the methods disclosed herein. Such communication devices may be capable of wireless and/or wired communications, in accordance with various embodiments of the disclosure.

Figure 2:
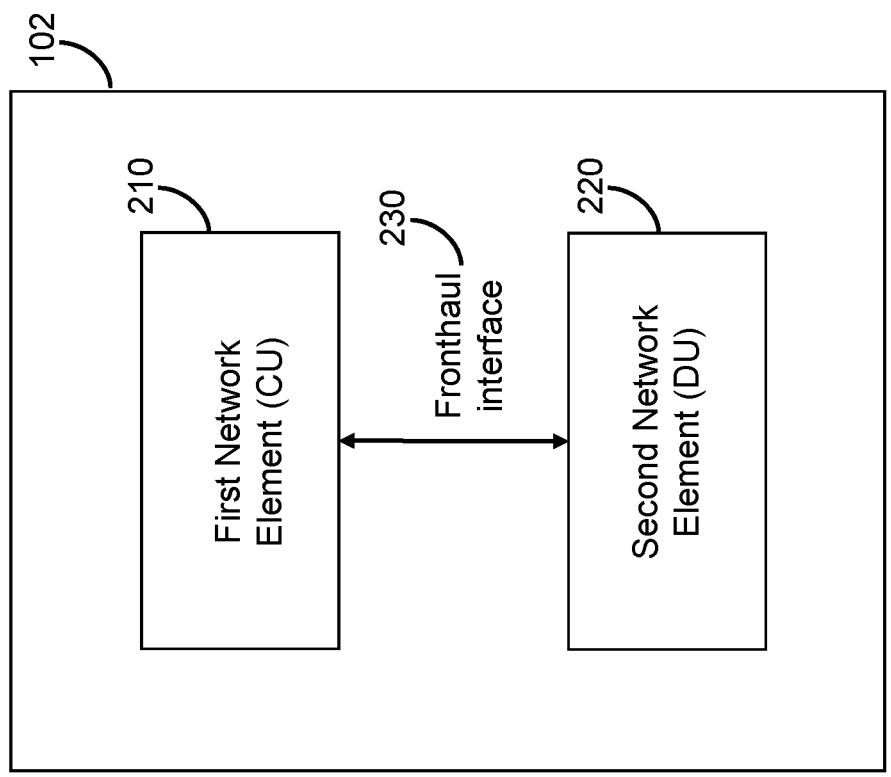
FIG. 2 illustrates a centralized unit—distributed unit (CU-DU) separation structure of a base station of the communication network of FIG. 1, in accordance with some embodiments of the invention.

As mentioned above, in the 5G network, a BS may be separated into a first network element (a centralized network element CU) and a second network element (a distributed network element DU). FIG. 2 illustrates a fronthaul interface between a first network element and a second network element of the BS 102, in accordance with some embodiments of the present disclosure. As shown, the BS 102 is divided into a first network element 210 and a second network element 220. The first network element 210 and the second network element 220 communicate through a fronthaul interface 230, where the fronthaul can be an ideal fronthaul or a non-ideal fronthaul according to different delays. An ideal fronthaul transmission has a relatively small delay, such as tens to hundreds of microseconds. A non-ideal fronthaul transmission has a relatively large delay, such as milliseconds. Due to the differences between the ideal and non-ideal fronthaul transmission, there are different ways to divide different network functions into the first network element 210 and the second network element 220.

In one embodiment, the first network element 210 is a CU and the second network element 220 is a DU, wherein the CU 210 and the DU 220 can cooperate to serve one or more cells as a base station. One CU may control a plurality of DUs at the same time, while a DU can be associated with one cell or a cell list that includes one or more cells. By controlling a number of DUs with a CU, a wireless system can have a baseband centralized processing and provide distributed remote services to users in a cloud architecture.

In a CU-DU separation network architecture, delay-insensitive network functions may be placed in the CU; and delay-sensitive network functions may be placed in the DU. Accordingly, a CU and a DU may have different hardware and structure for implementing the different network functions.

For example, a first protocol entity (e.g., a radio resource control (RRC) entity) is located at the CU. The first protocol entity generates control signals, maintains the establishment, modification, and/or release of the radio bearer, and maintains updated parameters of a second protocol entity, a third protocol entity, a fourth protocol entity, and the physical (PHY) layer of the base station. The second protocol entity has a similar or enhanced function compared to the PDCP (Packet Data Convergence Protocol) function of an LTE system. The third protocol entity has a similar or enhanced function compared to the RLC (Radio Link Control) function of an LTE system. The fourth protocol entity has a similar or enhanced function compared to the MAC (Medium Access Control) function of an LTE system. The DU comprises at least one of: the second protocol entity, the third protocol entity, the fourth protocol entity, the physical layer, and the radio frequency (RF) unit of the base station.

Figure 3:
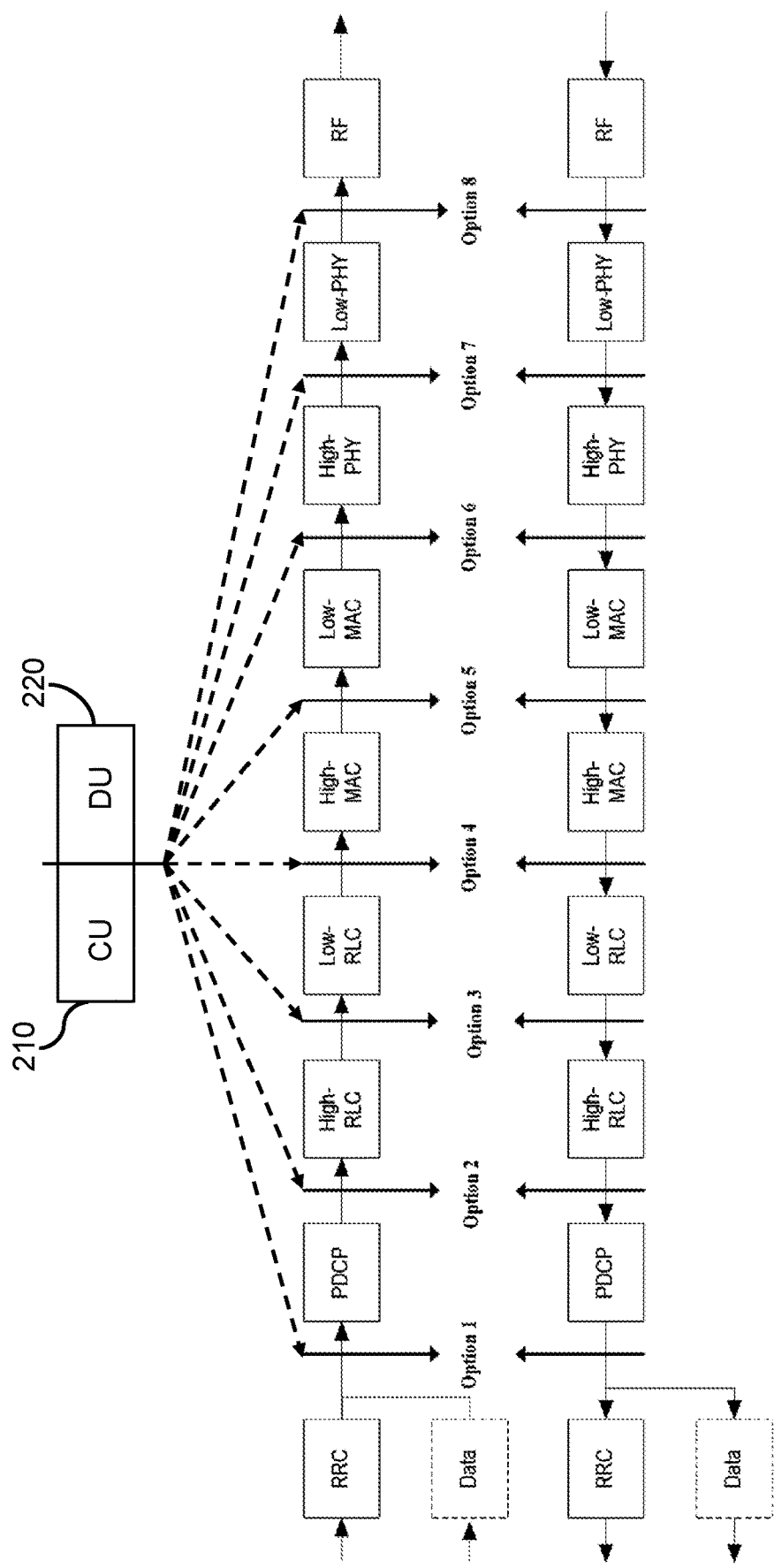
FIG. 3 illustrates exemplary functional divisions between a centralized unit (CU) and a distributed unit (DU) of the base station of FIG. 2, in accordance with some embodiments.

FIG. 3 illustrates exemplary functional divisions between the first network element and the second network element, e.g. between the CU 210 and the DU 220, in accordance with some embodiments of the present disclosure. More specifically, FIG. 3 illustrates eight possible functional division options between the CU 210 and the DU 220, which are respectively described below.

Option 1 (RRC/PDCP separation): The functional separation of this option is similar to the 1A structure in a dual connection (DC). RRC is located within CU; PDCP, RLC, MAC, PHY and RF functions are located in DU. That is, the entire UP is located in DU.

Option 2 (PDCP/RLC separation): The functional separation of this option is similar to the 3C structure in a dual connection (DC). RRC and PDCP are located within CU; RLC, MAC, PHY and RF functions are located in DU.

Option 3 (RLC high-level/low-level separation): The low-level RLC (partial function of the RLC), MAC, PHY, and RF are located within DU; RRC, PDCP and high-level RLC (partial function of the RLC) functions are located in the CU.

Option 4 (RLC-MAC separation): MAC, PHY and RF parts are located within DU; PDCP and RLC functions are located in the CU.

Option 5 (MAC internal separation): Some of the MAC functions (such as HARQ), PHY and RF are located in DU; the other upper level functions are located in the CU.

Option 6 (MAC-PHY): PHY and RF parts are located in DU; RRC, PDCP, RLC and MAC functions are located in the CU.

Option 7 (PHY internal separation): Some of the PHY functions and RF are located in DU; the other upper function is located in the CU.

Option 8 (PHY-RF separation): The RF part is located within the DU; and the other upper level functions are located in the CU.

In one embodiment, when a standard supports two or more options for dividing network functions into CU and DU, the wireless system can adaptively switch between the supported options during wireless communications.

Figure 4:
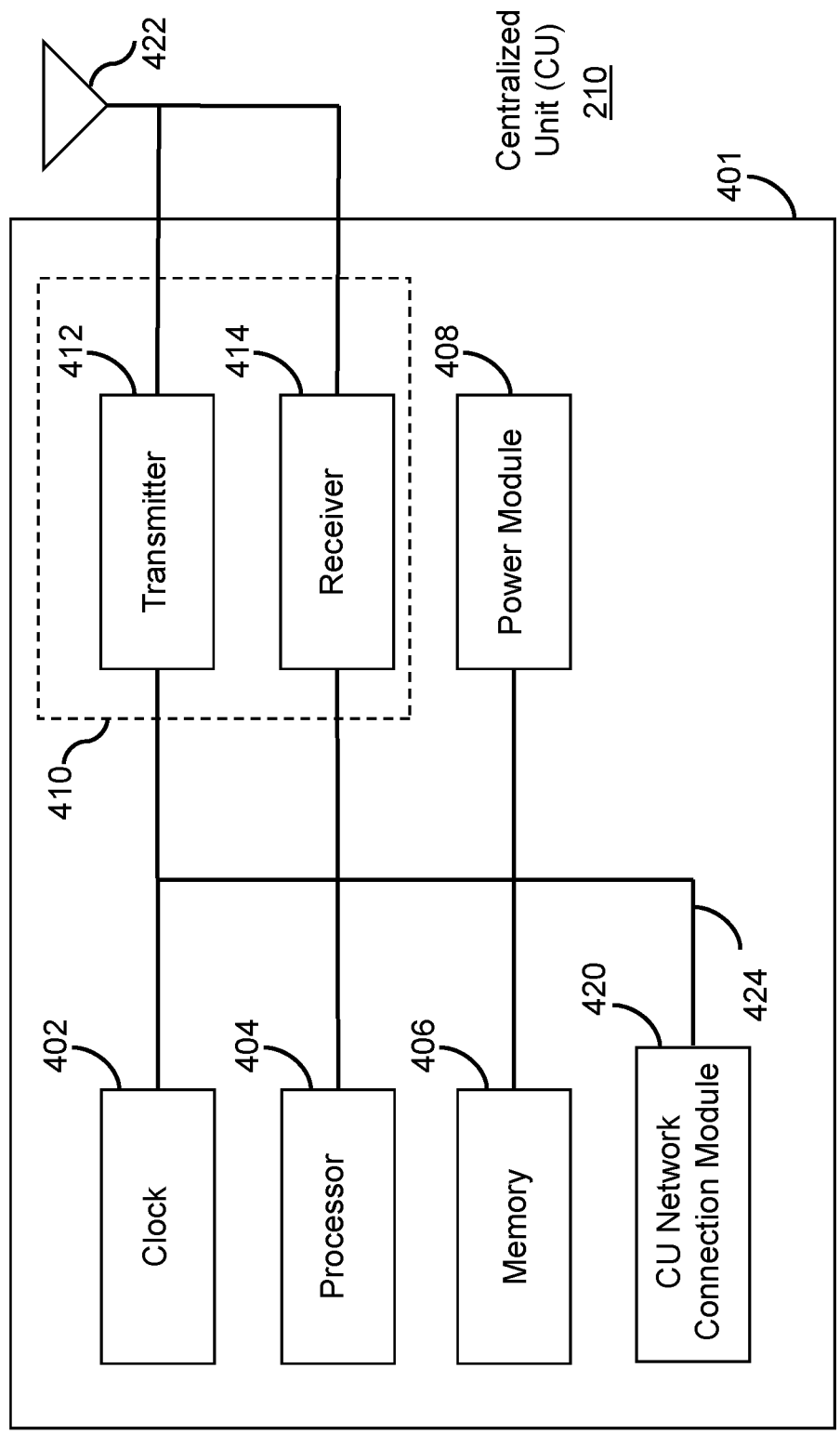
FIG. 4 illustrates an exemplary block diagram of a centralized unit (CU) of the base station of FIG. 2, in accordance with some embodiments.

FIG. 4 illustrates an exemplary block diagram of the CU 210, in accordance with some embodiments of the present disclosure. The CU 210 is an example of a device that can be configured to implement various methods described, as will be discussed below. As shown, the CU 210 includes a housing 401 comprising: a system clock 402, a processor 404, a memory 406, a transceiver 410 comprising a transmitter 412 and a receiver 414, a power module 408, and a CU network connection module 420. In some embodiments, the above-mentioned components/modules are coupled together by a bus system 424. The bus system 424 can include a data bus and, for example, a power bus, a control signal bus, and/or a status signal bus in addition to the data bus. It is understood that the components/modules of the CU 210 can be operatively coupled to one another using any suitable techniques and mediums.

In some embodiments, the system clock 402 provides the timing signals to the processor 404 for controlling the timing of all operations of the CU 210. The processor 404 controls the general operation of the CU 210 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 406, which can include both read-only memory (ROM) and random access memory (RAM), can provide instructions and data to the processor 404. A portion of the memory 406 can also include non-volatile random access memory (NVRAM). The processor 404 typically performs logical and arithmetic operations based on program instructions stored within the memory 406. The instructions (a.k.a., software) stored in the memory 406 can be executed by the processor 404 to perform the methods described herein. The processor 404 and memory 406 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 410, which includes the transmitter 412 and receiver 414, allows the CU 210 to transmit and receive data to and from a remote device (e.g., a DU). In one embodiment, an antenna 422 may be attached to the housing 401 and electrically coupled to the transceiver 410. In various embodiments, the CU 210 includes (not shown) multiple transmitters, multiple receivers, multiple transceivers, and/or multiple antennas. The transmitter 412 can be configured to wirelessly transmit packets having different packet types or functions, such packets being generated by the processor 404. Similarly, the receiver 414 is configured to receive packets having different packet types or functions, and the processor 404 is configured to process packets of a plurality of different packet types. For example, the processor 404 can be configured to determine the type of packet and to process the packet and/or fields of the packet accordingly. In another embodiment, the CU 210 may communicate with a DU via fiber-optic communication, such that the transmitter 412 and the receiver 414 can be configured to transmit and receive signals respectively through an optical fiber.

The power module 408 can include a power source such as one or more batteries, and a power regulator, to provide regulated power to each of the above-described modules in FIG. 4. In some embodiments, if the CU 210 is coupled to a dedicated external power source (e.g., a wall electrical outlet), the power module 408 can include a transformer and a power regulator.

The CU network communication module 420 generally represents the hardware, software, firmware, processing logic, and/or other components of the CU 210 that enable bi-directional communication between the transceiver 410 and other network components and communication devices configured to communication with the CU 210 (e.g., the DU 220). For example, the CU network communication module 420 may generate a message that comprises various information associated with the DU 220 and/or a UE that is cooperatively served by the CU 210 and DU 220. The CU network communication module 420 may send the message to the transmitter 412, and instruct the transmitter 412 to transmit the message to the DU 220 associated with the CU 210, where the CU 210 and the DU 220 can cooperate to serve as a first base station in a wireless network, and/or another CU that cooperates with at least one corresponding DU to serve as a second base station in the wireless network. Detailed operations of the CU 210 will be discussed in further detail below.

Figure 5:
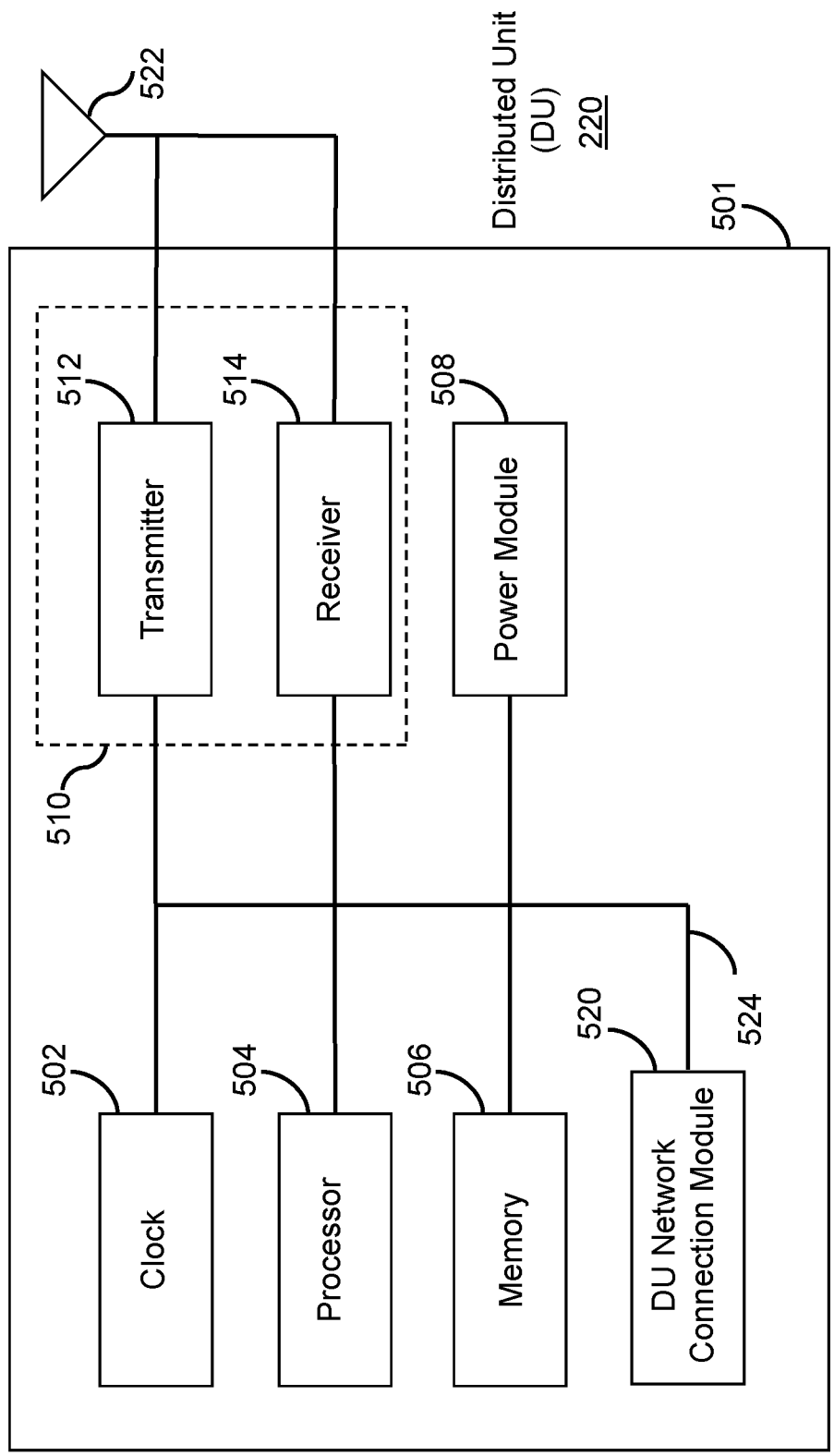
FIG. 5 illustrates an exemplary block diagram of a distributed unit (DU) of the base station of FIG. 2, in accordance with some embodiments.

FIG. 5 illustrates an exemplary block diagram of the DU 220, in accordance with some embodiments of the present disclosure. The DU 220 is an example of a device that can be configured to implement various methods described, as will be discussed below. Similarly with the CU 210 shown in FIG. 4, the DU 220 includes a housing 501 comprising: a system clock 502, a processor 504, a memory 506, a transceiver 510 comprising a transmitter 512 and a receiver 514, a power module 508, and a DU network connection module 520, wherein the above components/modules are coupled together by a bus system 524. In some embodiments, respective functionalities of the components/modules of the DU 220 (e.g., 502, 504, 506, 508, 510, and 522) are substantially similar to corresponding components/modules of the CU 210 except for the DU network connection module 520. Thus, the components/modules 502-522 are not repeated here.

The DU network communication module 520 generally represents the hardware, software, firmware, processing logic, and/or other components of the DU 220 that enable bi-directional communication between the transceiver 510 and other network components and communication devices configured to communication with the DU 220 (e.g., the CU 210). For example, the DU network communication module 520 may process a message that comprises various information associated with the DU 220 itself and/or the above-mentioned UE. The DU network communication module 520 may send the message to the transmitter 512, and instruct the transmitter 512 to transmit the message to the CU 210, and/or the UE. Detailed operations of the DU 220 will be discussed in further detail below. The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

Referring again to FIGS. 1 and 2, as discussed above, the UE 104 may be instructed to switch to the RRC INACTIVE state in order to reduce power consumption of the UE 104 and signaling overheads. The present disclosure provides various embodiments of systems and methods to illustrate how the CU 210 and DU 220 of the BS 102 operatively cooperate to cause the UE 104 to switch to the RRC INACTIVE state. After the UE 104 switches to the RRC INACTIVE state and moves into a new area (e.g., an RAN notification area), the disclosed embodiments further illustrate how the CU 210 and DU 220 operatively cooperate to update the area where the UE has moved to. Still further, the disclosed embodiments illustrate how the CU 210 reports a current area where the UE 104 is located, which can be the aforementioned RAN notification area, to a core network upon request.

Figure 6:
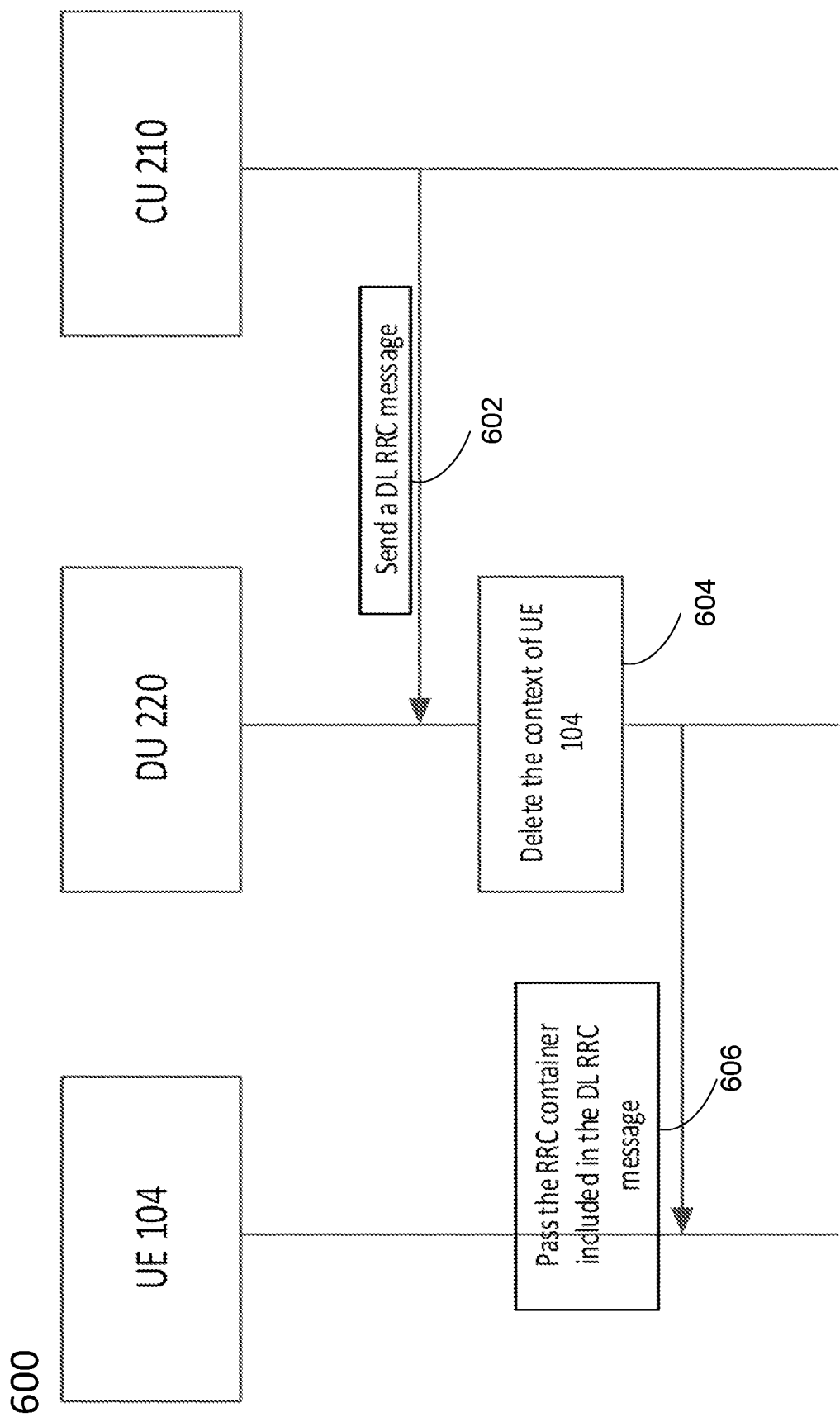
FIG. 6 illustrates a scenario in which the CU and DU of the base station of FIG. 2 cooperatively perform an exemplary method to switch a user equipment device to an RRC INACTIVE state, in accordance with some embodiments.

FIG. 6 illustrates a scenario in which the CU 210 and DU 220 cooperatively perform a method 600 to switch the UE 104 to the RRC INACTIVE state, in accordance with some embodiments. The method 600 starts with operation 602 in which the CU 210 sends a downlink radio resource control (DL RRC) message to the DU 220. In some embodiments, the CU 210 may send the DL RRC message to one or more associated DUs (e.g., 220) upon determining to switch the UE 104 to the RRC INACTIVE state due to various concerns, as discussed above.

In some embodiments, the DL RRC message may include at least one of the following information: an encoded container including a suspend signal, a flag signal indicative of deleting a context of the UE 104 (e.g., UE 104's capability, identifier, etc.) that was previously stored in the DU 220, a cell-radio network temporary identifier (C-RNTI) that the DU 220 previously assigned to the UE 104, a first application identifier (AP ID) over the fronthaul interface (e.g., the F1 interface) between the CU 210 and DU 220 that the DU 220 previously assigned to the UE 104 (typically known as "DU F1 UE AP ID"), an optional second AP ID over the F1 interface between the CU 210 and DU 220 that the CU 210 previously assigned to the UE 104 (typically known as "CU F1 UE AP ID"), and a signaling radio bearer (SRB) type.

In some embodiments, the suspend signal is an F1 interface signal configured to cause the UE 104 to switch to the RRC INACTIVE state. In some embodiments, the CU 210 may encode the suspend signal in the container. More specifically, the container including the suspend signal may be encoded at an RRC layer, which is accordingly referred to as an "RRC container," and when the DU 220 and UE 104 respectively receive the RRC container, as will be discussed below, the DU 220 does not need to decode the RRC container; but the UE 104 which also include a corresponding RRC layer, can decode the RRC container to obtain the suspend signal.

Next, the method 600 continues to operation 604 in which the DU 220 deletes the context of the UE 104. In some embodiments, when the DU 220 receives the DL RRC message, based on the flag signal included in the DL RRC message, the DU 220 determines whether to delete the context of the UE 104. For example, when the flag signal is at a first logic state (e.g., a logic 1), the DU 220 may delete the context of the UE 104; and when the flag signal is at a second logic state (e.g., a logic 0), the DU 220 may keep the context of the UE 104.

Next, the method 600 continues to operation 606 in which the DU 220 passes the RRC container included in the DL RRC message to the UE 104. As mentioned above, in some embodiments, when the DU 220 receives the DL RRC message, the DU 220 does not decode the RRC container carrying the suspend signal (i.e., passing the container directly to the UE 104). As such, when the UE 104 receives the RRC container, the UE 104 decodes the RRC container to retrieve the suspend signal so as to switch itself to the RRC INACTIVE state.

Figure 7:
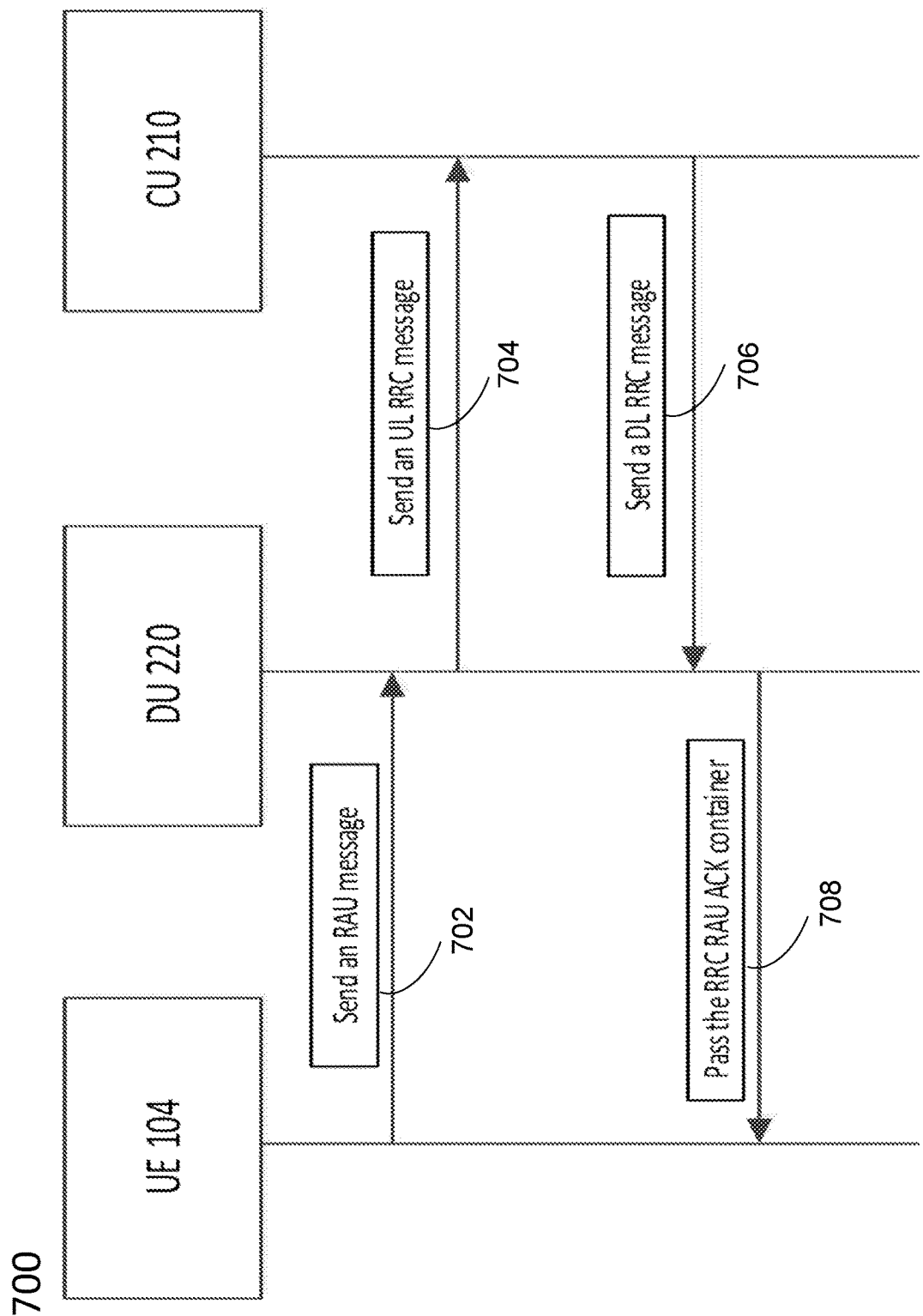
FIG. 7 illustrates a scenario in which the CU and DU of the base station of FIG. 2 cooperatively perform an exemplary method to update a RAN notification area, in accordance with some embodiments.

FIG. 7 illustrates a scenario in which the CU 210 and DU 220 cooperatively perform a method 700 to update an RAN notification area where the UE 104 has moved to, in accordance with some embodiments. In some embodiments, when the UE 104 is under the RRC INACTIVE state, such a process to update the RAN notification area of the UE 104 may be referred to as a random access update (RAU) process. Further, in some embodiments, during such an RAU process, a link over an interface between the CU 210 and an access and mobility management function (AMF) of a core network (e.g., an NG interface) may remain intact.

The method 700 starts with operation 702 in which the UE 104 sends a random access update (RAU) message to the DU 220. In some embodiments, the UE 104 encodes the RAU message at the RRC layer, and sends the RAU message upon requesting to update a respective RAN notification area. As mentioned above, when the UE 104 is under the RRC INACTIVE state, the UE 104 may move around. When the UE 104 moves into a new RAN notification area, by receiving system information broadcasted in that new RAN notification area, the UE 104 may determine that it has entered into a different RAN notification area. In some embodiments, the UE 104 may send such an RAU message to the DU 220 that serves the new RAN notification area. As such, the new RAN notification area may be still served by the CU 210.

Next, the method 700 continues to operation 704 in which the DU 220 sends an uplink radio resource control (UL RRC) message to the CU 210. In some embodiments, the DU 220 may send such an UL RRC message upon receiving the RAU message from one or more UEs (e.g., UE 104).

In some embodiments, the UL RRC message may include at least one of the following information: a encoded container including the RAU message (hereinafter "RRC RAU container"), a cell-radio network temporary identifier (C-RNTI) that the DU 220 previously assigned to the UE 104, an application identifier (AP ID) over the fronthaul interface (e.g., F1 interface) between the CU 210 and DU 220 that the DU 220 previously assigned to the UE 104 (typically known as "DU F1 UE AP ID"), and a signaling radio bearer (SRB) type. In some embodiments, the RRC RAU container may be processed (e.g., encoded) by and then sent from the UE 104. Similarly, the DU 220 does not decode the RRC RAU container, but passes the RRC RAU container to the CU 210. In some embodiments, the DU F1 UE AP ID, as discussed herein, may be identical to the DU F1 UE AP ID discussed with respect to FIG. 6.

Next, the method 700 continues to operation 706 in which the CU 210 sends a DL RRC message to the DU 220. In some embodiments, upon receiving the RRC RAU container included in the UL RRC message, the CU 210 decodes the RRC RAU container to retrieve the RAU message. When successfully decoding the RAU message, the CU 210 sends the DL RRC message (hereinafter "successful DL RRC message") to the DU 220; and on the other hand, when unsuccessfully decoding the RAU message, the CU 210 sends another DL RRC message ("unsuccessful DL RRC message") to the DU 220, which will be respectively discussed below.

In some embodiments, the successful DL RRC message includes at least one of the following information: an encoded container including an area update acknowledgement RRC message (hereinafter "RRC RAU ACK container" and "RAU ACK message," respectively), the C-RNTI that the DU 220 previously assigned to the UE 104, the DU F1 UE AP ID that the DU 220 previously assigned to the UE 104, an optional AP ID over the F1 interface between the CU 210 and DU 220 that the CU 210 previously assigned to the UE 104 (typically known as "CU F1 UE AP ID"), and a flag signal indicative of deleting a context of the UE 104 (e.g., UE 104's capability, identifier, etc.) that was previously stored in the DU 220. In some embodiments, the CU F1 UE AP ID, as discussed herein, may be identical to the CU F1 UE AP ID discussed with respect to FIG. 6.

In some embodiments, the unsuccessful DL RRC message includes substantially similar information as the successful DL RRC message does except that, instead of the RRC RAU ACK container, the unsuccessful DL RRC message includes a different encoded container including an RRC release message (hereinafter "RRC release container"). The RRC release message may be generated by the CU 210 so as to cause the UE 104 to switch to an RRC IDLE state (i.e., releasing all, or substantially all, RRC resources).

According to some embodiments, since the successful and unsuccessful DL RRC messages each includes the flag signal, regardless of whether the successful or unsuccessful DL RRC message is received by the DU 220, the DU 220 may delete the context of the UE 104 that was stored in the DU 220 based on a logic state of the flag signal (as described above).

In some embodiments, when in the operation 706, the CU 210 sends the successful DL RRC message, including the RRC RAU ACK container, the method 700 continues to operation 708 in which the DU 220 passes the RRC RAU ACK container to the UE 104. Similar to other containers described above, the DU 220 does not decode the RRC RAU ACK container, but the UE 104 decodes the RRC RAU ACK container to retrieve the included RAU ACK message. Accordingly, the RAU process, initiated by the UE 104, may be completed. On the other hand, when in the operation 706, the CU 210 sends the unsuccessful DL RRC message including the RRC release container, the DU 220 may pass the RRC release container to the UE 104 in the operation 708, and similarly, the UE 104 may decode the RRC release message from the RRC release container so as to cause itself to switch to the RRC IDLE state.

Figure 8:
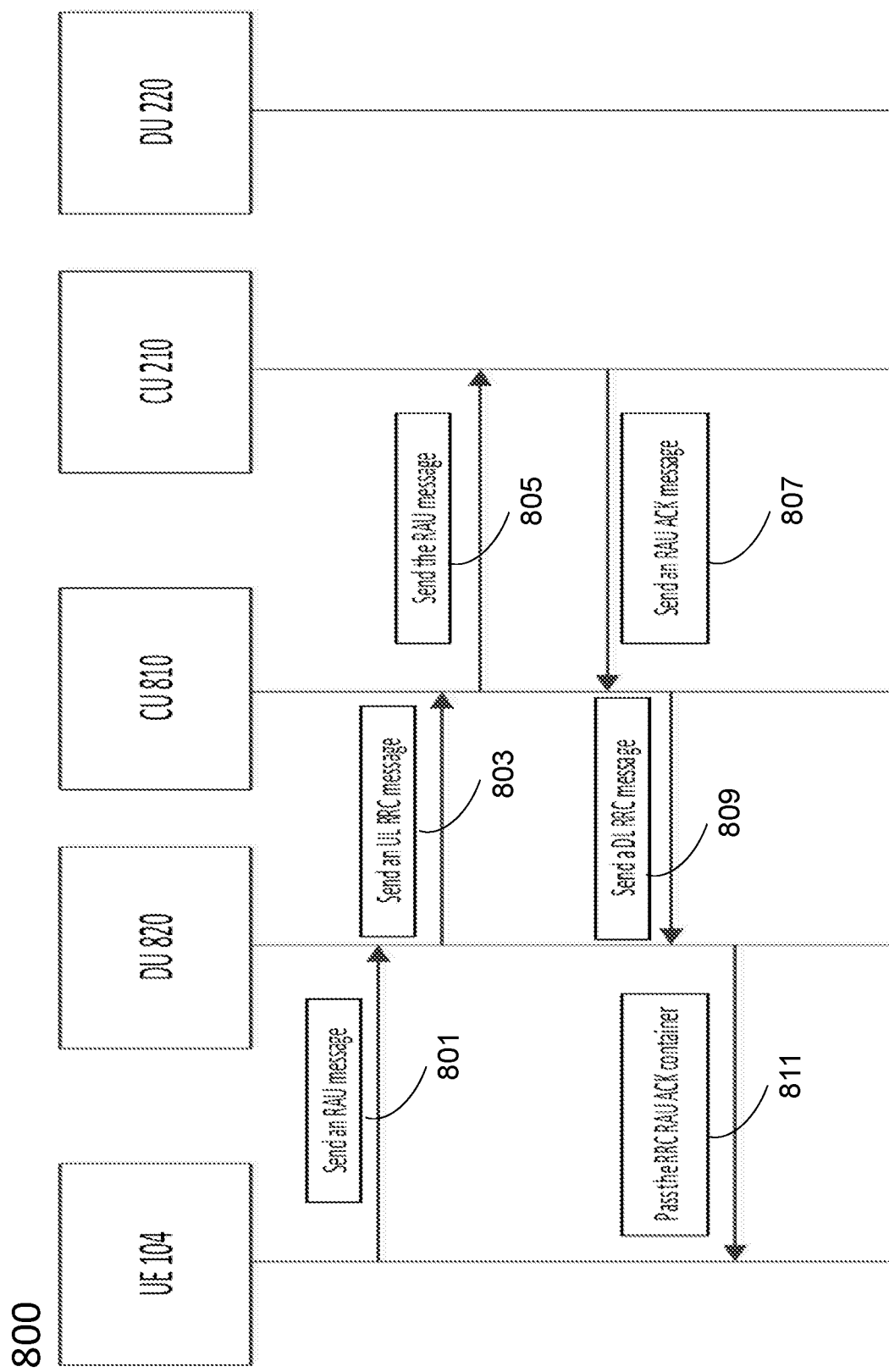
FIG. 8 illustrates a scenario in which the CU and DU of the base station of FIG. 2, together with another base station, cooperatively perform an exemplary method to update an RAN notification area, in accordance with some embodiments.

FIG. 8 illustrates a scenario in which the CU 210 and DU 220 (serving as the BS 102) and another pair of CU 810 and DU 820 serving as another BS, different from the BS 102, cooperatively perform a method 800 to update an RAN notification area where the UE 104 has moved to, in accordance with some embodiments. Different from the scenario illustrated in FIG. 7 in which the new RAN notification area that the UE 104 moves into is still served by the same CU 210, in the scenario of FIG. 8, the UE 104 may move into a new RAN notification area that is not served by the CU 210. As such, an RAU process may be initiated by the UE 104. However, similar to the scenario of FIG. 7, during the RAU process of FIG. 8, a link over the interface between the CU 210 and the access and mobility management function (AMF) of the core network (e.g., an NG interface) may remain intact.

The method 800 starts with operation 801 in which the UE 104 sends a random access update (RAU) message to the DU 820. In some embodiments, the UE 104 encodes the RAU message at the RRC layer, and sends the RAU message upon requesting to update a respective RAN notification area. As mentioned above, when the UE 104 is under the RRC INACTIVE state, the UE 104 may move around. When the UE 104 moves into a new RAN notification area, by receiving system information broadcasted in that new RAN notification area, the UE 104 may determine that it has entered into a different RAN notification area. In some embodiments, the UE 104 may send such an RAU message to the DU 820 that serves the new RAN notification area. As such, the new RAN notification area may be served by the CU 810 instead of the CU 210.

Next, the method 800 continues to operation 803 in which the DU 820 sends an uplink radio resource control (UL RRC) message to the corresponding CU 810. In some embodiments, the DU 820 may send such an UL RRC message upon receiving the RAU message from one or more UEs (e.g., UE 104).

In some embodiments, the UL RRC message may include at least one of the following information: a encoded container including the RAU message (hereinafter "RRC RAU container"), a cell-radio network temporary identifier (C-RNTI) that the DU 820 previously assigned to the UE 104, an application identifier (AP ID) over the fronthaul interface (e.g., F1 interface) between the DU 810 and DU 820 that the DU 820 previously assigned to the UE 104 (typically known as "DU F1 UE AP ID"), and a signaling radio bearer (SRB) type. In some embodiments, the RRC RAU container may be processed (e.g., encoded) by and then sent from the UE 104. Similarly, the DU 820 does not decode the RRC RAU container, but passes the RRC RAU container to the CU 810. In some embodiments, the DU F1 UE AP ID, as discussed herein, may be identical to the DU F1 UE AP ID discussed with respect to FIG. 6.

Next, the method 800 continues to operation 805 in which the CU 810 sends the RAU message to the CU 210 over an interface between the CU 810 and the CU 210 (e.g., an Xn interface). In some embodiments, upon receiving the RRC RAU container, the CU 810 decodes the RRC RAU container to retrieve the RAU message, and sends the RAU message to the CU 210. In some embodiments, the RAU message may be sent over the Xn interface using an application layer. Next, the method 800 continues to operation 807 in which the CU 210 sends an area update acknowledgement RRC message (hereinafter "RAU ACK message") to the CU 810. In some embodiments, when the CU 210 successfully processes the RAU message and determines that the CU 210 remains serving as an anchor point to the core network (i.e., still holding the context of the UE 104), the CU 210 sends the RAU ACK message to the CU 810. Similarly, the RAU ACK message may be sent over the Xn interface using the application layer. Similar to the operation 706 of the method 700 of FIG. 7, when the CU 210 unsuccessfully processes the RAU message, the CU 210 may send an update failure message to the CU 810, and the CU 810 generates an RRC release message to cause the UE 104 to switch to the RRC IDLE state, which is not repeatedly discussed here.

Next, the method 800 continues to operation 809 in which the CU 810 sends a DL RRC message to the DU 820. In some embodiments, upon receiving the RAU ACK message, the CU 810 sends the DL RRC message to the DU 820. In some embodiments, the DL RRC message includes at least one of the following information: an encoded container including the RAU ACK message (hereinafter "RRC RAU ACK container"), the C-RNTI that the DU 820 previously assigned to the UE 104, the DU F1 UE AP ID that the DU 820 previously assigned to the UE 104, an optional AP ID over the F1 interface between the CU 810 and DU 820 that the CU 810 previously assigned to the UE 104 (typically known as "CU F1 UE AP ID"), and a flag signal indicative of deleting a context of the UE 104 (e.g., UE 104's capability, identifier, etc.) that was previously stored in the DU 820. In some embodiments, upon receiving the flag signal, the DU 820 may delete the context of the UE 104 that was stored in the DU 820 based on a logic state of the flag signal (as described above). In some embodiments, the CU F1 UE AP ID, as discussed herein, may be identical to the CU F1 UE AP ID discussed with respect to FIG. 6.

Next, the method 800 continues to operation 811 in which the DU 820 passes the RRC RAU ACK container to the UE 104. Similar to other containers described above, the DU 820 does not decode the RRC RAU ACK container, but the UE 104 decodes the RRC RAU ACK container to retrieve the included RAU ACK message. Accordingly, the RAU process, initiated by the UE 104, may be completed.

Figure 9:
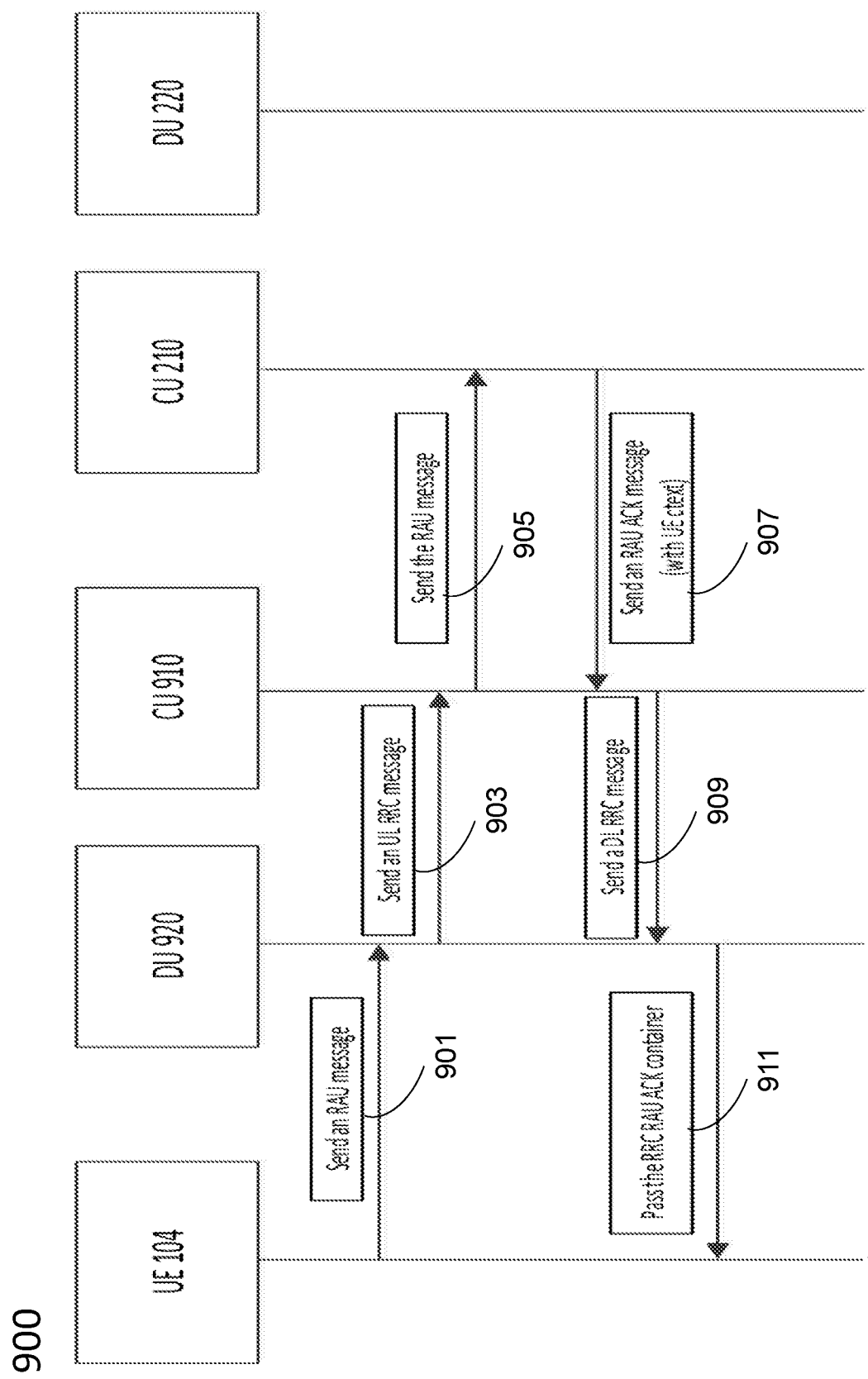
FIG. 9 illustrates a scenario in which the CU and DU of the base station of FIG. 2, together with another base station, cooperatively perform another exemplary method to update an RAN notification area, in accordance with some embodiments.

FIG. 9 illustrates a scenario in which the CU 210 and DU 220 (serving as the BS 102) and another pair of CU 910 and DU 920 serving as another BS, different from the BS 102, cooperatively perform a method 900 to update an RAN notification area where the UE 104 has moved to, in accordance with some embodiments. The scenario of FIG. 9 is substantially similar to the scenario of FIG. 8 except that, in FIG. 9, the CU 910 replaces the CU 210 serving as the new anchor point to the core network. Accordingly, the reference numerals of the method 800 are respectively incremented by 100 to be used in the method 900. It is noted that operations 901 to 911 are respectively identical to the operations 801 to 811 except for the operation 907. More specifically, since the CU 210 does not serve as the anchor point, when the CU 210 sends the RAU ACK message to the CU 910 during the operation 907 in the method 900, the RAU ACK message may further include the context of the UE 104. Alternatively stated, the context of the UE 104 is "transferred" from the CU 210 to the CU 910. In some embodiments, the CU 210 may determine whether itself still serves as the anchor point during the operation 907 of the method 900.

Similarly, in some embodiments, during the RAU process as illustrated in the scenario of FIG. 9, a link over an interface between the CU 210 and an access and mobility management function (AMF) of a core network (e.g., an NG interface) may remain intact. However, since the CU 910 has replaced the CU 210 as the new anchor point to the core network, it is understood by persons of ordinary skill in the art that the AMF (not shown) and the CU 910 may exchange one or more messages to update a data communication route.

FIG. 10 illustrates a scenario in which a random access network node (RAN node) and an access and mobility management function (AMF) of a core network cooperatively perform a method 1000 to update a location of a UE served by the RAN node, in accordance with some embodiments. It is understood that the RAN node, as described herein, can be a gNB, an eNB connected to the AMF, a CU of a BS, etc.

The method 1000 starts with operation 1002 in which the AMF requests to report a location of the UE. In some embodiments, the AMF may send a first message over the NG interface to the RAN node requesting to update the location of the UE. In some embodiments, the first message may include at least one of the following information: an identifier of the UE over the NG interface, a report type, and a report resolution. In an embodiment, the report type may include an RRC INACTIVE type. Specifically, when the UE switches to the RRC INACTIVE state and initiates an area update process (e.g., the RAU process) after moving into a new area, the RAN node is requested to report the location of the UE. And the report resolution may include a resolution of a cell, a resolution of an RAN notification area, etc.

Next, the method 1000 continues to operation 1004 in which the RAN node reports the location of the UE. In some embodiments, after the RAN node successfully processes the first message, the RAN node may send a second message back to the AMF to report the location of the UE. In some embodiments, the second message may include at least one of the following information: the identifier of the UE over the NG interface, a last updated location of the UE when the UE is under the RRC INACTIVE state, etc. Specifically, the location of the UE can be indicated by: a cell global identifier, a tracking area identifier, an RAN notification area identifier.

The method 1000 proceeds to operation 1004 in which the RAN node fails to report the location of the UE. In some cases, the RAN node may unsuccessfully process the first message. As such, the RAN node may send a third message back to the AMF indicating that the update on the location of the UE has failed. It is noted that the operation 1004 may not necessarily occur subsequently to the operation 1002.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations.

Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method for a first wireless communication node and a second wireless communication node that cooperate to serve as a first base station in a wireless network, comprising:
   receiving, by the second wireless communication node, a first message from the first wireless communication node, the first message comprising:
      a first encoded container comprising a suspend signal configured to switch a third wireless communication node to a radio resource control inactive mode,
      a first application identifier assigned by the second wireless communication node for the third wireless communication node, wherein the first application identifier is transmitted over a fronthaul interface between the first wireless communication node and the second wireless communication node,
      a second application identifier assigned by the first wireless communication node for the third wireless communication node, wherein the second application identifier is transmitted over the fronthaul interface between the first wireless communication node and the second wireless communication node, and
      a signaling radio bearer type; and
   sending, by the second wireless communication node, the suspend signal to the third wireless communication node.

2. The method of claim 1, wherein the first wireless communication node is a centralized unit of the first base station, and the second wireless communication node is a distributed unit of the first base station.

3. The method of claim 1, further comprising:
   when the third wireless communication node switches to the radio resource control inactive mode, transmitting, by the second wireless communication node, a second message to the first wireless communication node indicating that the third wireless communication node has sent a radio resource control message to the second wireless communication node requesting to update a random access network notification area.

4. The method of claim 3, wherein the second message comprises:
   a second encoded container comprising the radio resource control message, the cell-radio network temporary identifier that the second wireless communication node assigned to the third wireless communication node, and the first application identifier transmitted over the fronthaul interface between the first and second wireless communication nodes that the second wireless communication node assigned to the third wireless communication node.

5. The method of claim 4, further comprising:
   receiving, by the second wireless communication node, a third message from the first wireless communication node,
   wherein the third message comprises: a third encoded container comprising an area update acknowledgement radio resource control message, the first application identifier transmitted over the fronthaul interface between the first wireless communication node and the second wireless communication node that the second wireless communication node assigned to the third wireless communication node, and the second application identifier transmitted over the fronthaul interface between the first wireless communication node and the second wireless communication node that the first wireless communication node assigned to the third wireless communication node.

6. The method of claim 5, further comprising:
   sending, by the second wireless communication node, the third encoded container to the third wireless communication node for the third wireless communication node to retrieve the area update acknowledgement radio resource control message from the third encoded container.

7. A non-transitory computer readable medium storing instructions, which when executed by at least one processor, cause the at least one processor to perform the method of claim 1.

8. A second wireless communication node that cooperate with a first wireless communication node to serve as a first base station in a wireless network, the second wireless communication node comprising:
   a transceiver and at least one processor configured to:
      receive a first message from the first wireless communication node, the first message comprising:
         a first encoded container comprising a suspend signal configured to switch a third wireless communication node to a radio resource control inactive mode,
         a first application identifier assigned by the second wireless communication node for the third wireless communication node, wherein the first application identifier is transmitted over a fronthaul interface between the first wireless communication node and the second wireless communication node,
         a second application identifier assigned by the first wireless communication node for the third wireless communication node, wherein the second application identifier is transmitted over the fronthaul interface between the first wireless communication node and the second wireless communication node, and
         a signaling radio bearer type; and
      send the suspend signal to the third wireless communication node.

9. The second wireless communication node of claim 8, wherein the first wireless communication node is a centralized unit of the first base station, and the second wireless communication node is a distributed unit of the first base station.

10. The second wireless communication node of claim 8, wherein the transceiver is further configured to:
    when the third wireless communication node switches to the radio resource control inactive mode, transmit a second message to the first wireless communication node indicating that the third wireless communication node has sent a radio resource control message to the second wireless communication node requesting to update a random access network notification area.

11. The second wireless communication node of claim 10, wherein the second message comprises:
    a second encoded container comprising the radio resource control message, the cell-radio network temporary identifier that the second wireless communication node assigned to the third wireless communication node, and the first application identifier transmitted over the fronthaul interface between the first and second wireless communication nodes that the second wireless communication node assigned to the third wireless communication node.

12. The second wireless communication node of claim 11, wherein the transceiver is further configured to:
receive a third message from the first wireless communication node,
wherein the third message comprises: a third encoded container comprising an area update acknowledgement radio resource control message, the first application identifier transmitted over the fronthaul interface between the first wireless communication node and the second wireless communication node that the second wireless communication node assigned to the third wireless communication node, and the second application identifier transmitted over the fronthaul interface between the first wireless communication node and the second wireless communication node that the first wireless communication node assigned to the third wireless communication node.

13. The second wireless communication node of claim 12, wherein the transceiver is further configured to:
send the third encoded container to the third wireless communication node for the third wireless communication node to retrieve the area update acknowledgement radio resource control message from the third encoded container.

14. A method for a third wireless communication node, comprising:
receiving, by the third wireless communication node, a suspend signal from a second wireless communication node, the suspend signal being included in a first encoded container in a first message received by a second wireless communication node from a first wireless communication node, the first message comprising:
a first application identifier assigned by the second wireless communication node for the third wireless communication node, wherein the first application identifier is transmitted over an fronthaul interface between a first communication node and the second wireless communication node, the first and second wireless communication nodes cooperating to serve as a first base station in a wireless network,
a second application identifier assigned by the first wireless communication node for the third wireless communication node, wherein the second application identifier is transmitted over the fronthaul interface between the first and second wireless communication nodes, and
a signaling radio bearer type; and
switching, by the third wireless communication node, to a radio resource control inactive mode responsive to the suspend signal.

15. The method of claim 14, further comprising:
transmitting, by the third wireless communication node, a radio resource control message to the second wireless communication node requesting to update a random access network notification area.

16. The method of claim 14, further comprising:
receiving, by the third wireless communication node, the third encoded container from the second wireless communication node, the third encoded container comprising an area update acknowledgement radio resource control message.

17. A non-transitory computer readable medium storing instructions, which when executed by at least one processor, cause the at least one processor to perform the method of claim 14.

18. A third wireless communication node, comprising:
a transceiver configured to:
receive a suspend signal from a second wireless communication node, the suspend signal being included in a first encoded container in a first message received by a second wireless communication node from a first wireless communication node, the first message comprising:
a first application identifier assigned by the second wireless communication node for the third wireless communication node, wherein the first application identifier is transmitted over an fronthaul interface between a first communication node and the second wireless communication node, the first and second wireless communication nodes cooperating to serve as a first base station in a wireless network,
a second application identifier assigned by the first wireless communication node for the third wireless communication node, wherein the second application identifier is transmitted over the fronthaul interface between the first and second wireless communication nodes, and
a signaling radio bearer type; and
at least one processor configured to:
switch to a radio resource control inactive mode responsive to the suspend signal.

19. The third wireless communication node of claim 18, wherein the transceiver is further configured to:
transmit a radio resource control message to the second wireless communication node requesting to update a random access network notification area.

20. The third wireless communication node of claim 18, wherein the transceiver is further configured to:
receive the third encoded container from the second wireless communication node, the third encoded container comprising an area update acknowledgement radio resource control message.

* * * * *

UNITED STATES PATENT AND TRADEMARK OFFICE
CERTIFICATE OF CORRECTION

PATENT NO. : 11,477,842 B2
APPLICATION NO. : 17/216990
DATED : October 18, 2022
INVENTOR(S) : Yin Gao and He Huang Page 1 of 1

It is certified that error appears in the above-identified patent and that said Letters Patent is hereby corrected as shown below:

In the Claims

In Claim 4, Column 15, Line 45, please delete "the" and insert -- a --

In Claim 11, Column 16, Line 60, please delete "the" and insert -- a --

In Claim 14, Column 17, Line 32, please delete "by a" and insert -- by the --

In Claim 14, Column 17, Line 39, please delete "between a first communication" and insert -- between the first wireless communication --

In Claim 16, Column 18, Line 7, please delete "node, the" and insert -- node, a --

In Claim 18, Column 18, Line 20, please delete "by a" and insert -- by the --

In Claim 18, Column 18, Line 27, please delete "between a first communication" and insert -- between the first wireless communication --

In Claim 20, Column 18, Line 48, please delete "receive the third" and insert -- receive a third --

Signed and Sealed this
Twenty-ninth Day of November, 2022

Katherine Kelly Vidal
*Director of the United States Patent and Trademark Office*